Patented Aug. 21, 1928.

1,681,891

UNITED STATES PATENT OFFICE.

DUANE E. WEBSTER, OF WORCESTER, MASSACHUSETTS, ASSIGNOR TO NORTON COMPANY, OF WORCESTER, MASSACHUSETTS, A CORPORATION OF MASSACHUSETTS.

MANUFACTURE OF ABRASIVE ARTICLES.

No Drawing.    Application filed October 26, 1926.    Serial No. 144,408.

This invention relates to articles in which rubber serves to unite, coat, or bond together granular material of the type of abrasive grains.

The invention is directed particularly to the manufacture of rubber bonded abrasive articles. The usual method of making these articles is by mixing the material, such as crystalline fused alumina, silicon carbide, corundum, emery and the like with crêpe rubber and sulphur by the use of mixing rolls. This mixture is then cut into the shape desired and thereafter vulcanized. Another method comprises softening the rubber with gasoline, naphtha, or some other solvent and mixing with abrasive material in a mechanical mixing machine and thereafter shaping and drying the mixture prior to vulcanization.

The first of the above mentioned methods has some disadvantages, particularly because of the necessity for passing the abrasive and rubber mixture repeatedly through mixing rolls. In the process of rolling the grain into the rubber the grain is crushed to a much finer size than that originally selected. This may involve a serious disadvantage in cases where it is desired that the grain be of a large, coarse size. Also, there is a very definite limit to the amount of abrasive material that can be mixed with a given amount of rubber on such mixing rolls and the abrasive articles thus made often contain a larger portion of rubber than is desired.

The use of solvents, such as gasoline or naptha etc. has been found to be expensive as well as to involve considerable fire hazard. Moreover, the solvents are hard to remove from the rubber without special expensive equipment, and unless completely removed affect detrimentally the hardness of the abrasive articles. Furthermore, it has not been feasible, heretofore, by using the ordinary method of manufacture to make a rubber bonded abrasive article which has a porous and open structure or other desired abrading characteristics.

In the manufacture of rubber bonded articles containing abrasive grain or other granular material by methods involving the use of a fluid rubber mixture containing one or more liquids whose presence is not desired in the finished article, it has been difficult to produce with regularity articles of a desired uniformity because of the failure to completely remove all of the undesirable liquid from the bond. Often such articles have been found to contain soft spots which are extremely objectionable in articles such as grinding wheels, floor tiles and the like. The utility of an abrasive wheel for a given grinding operation depends to a large extent upon the character, uniformity and quantity of the bond employed. If the action of the bond in one portion of the wheel is different from that in another portion, the grinding operation is detrimentally affected.

It is an object of the invention to overcome these difficulties and provide an improved method for making rubber bonded articles containing granular material which has the advantage of economy, both in the cost of material and in ease in handling and mixing of the ingredients.

It is a further object of the invention to provide certain improvements in making such articles by methods involving the use of a fluid rubber mixture, such for example, as a rubber solution as above mentioned, whereby a more complete and satisfactory drying or removal of undesirable liquids is obtained and a uniform finished article produced having more desirable qualities.

In accordance with the invention rubber bonded granular articles, such as grinding wheels, non-slip floor tiles and the like, may be produced by intimately admixing granular material, such as abrasive grain, with a fluid rubber mixture, such as rubber latex, which has a consistency such that the granular material may be easily and intimately mixed therewith and maintained uniformly distributed therein. Thus, the granular material may be intimately admixed with rubber latex alone, preferably with a latex containing at least 60 per cent by weight of total rubber, or rubber latex and a suitable agent, such as benzol, naptha or a solution of rubber, together with a vulcanizing agent. A fluid rubber mixture suitable for the practice of the invention should have a total rubber content of not less than about 30 per cent by weight.

The term "rubber latex" as used throughout this specification and the appended claims is intended to include a milky or lactiferous sap or juice obtained from certain plants, such as the *Hevea brasiliensis*, from which rubber is commonly obtained.

By one practice of the invention as applied to the manufacture of rubber bonded abrasive articles, such as grinding wheels, suitable proportions of abrasive grain and rubber latex are agitated in a suitable apparatus with an agent capable of increasing the consistency or viscosity of the latex to a point such that the grain may be uniformly mixed therewith and maintained suspended therein. Preferably, a rubber solution containing from about ½ per cent to about 10 per cent of rubber dissolved in solvent naptha, benzol, or the like, may be employed, but if desired naptha or benzol alone or a similar agent capable of increasing the consistency of the rubber latex may be used. It is preferable to mix the abrasive grain with a vulcanizing agent, such as sulphur, in a kneading machine and then thoroughly mix therewith a rubber solution, such as a solution of rubber in solvent naptha. Finally, an appropriate amount of rubber latex is added and mixed until complete emulsion takes place or until the fluid rubber mixture is thoroughly and intimately mixed with the abrasive grain and sulphur. The mixture is then poured into a suitable form and dried to remove any undesired liquids. The dried mixture is then molded under a pressure of from about ¼ of a ton to about two tons per square inch while subjected to a temperature of from about 140° C. to about 200° C. Suitable proportions of ingredients follow:

| | Per cent by weight. |
|---|---|
| Rubber latex | 18.3 |
| Sulphur | 3.5 |
| Abrasive | 69.0 |
| 2½% solution of rubber in solvent naptha | 9.1 |

The resultant mixture may be dried for a suitable length of time at a temperature above the normal boiling point of water, such for example, as that about 110° C. for about 15 hours. It has been found, however, that improved results are obtained by drying at a temperature from about 50° C. to about 90° C. while subjected to a reduced pressure equivalent to about 700 mm. of mercury, or as great as is possible.

In the practice of the invention as applied particularly to the manufacture of rubber bonded abrasive articles, the articles can be molded to any desired thickness, whereas by the former milling method wherein the rubber mixture is repeatedly passed through mixing rolls there is a definite limit to the size and thickness of an article which can be handled conveniently and satisfactorily. Furthermore, substantially all the abrasive grain in the finished article will be exactly of the same grain size as those initially incorporated during manufacture. On the other hand, it was not at all uncommon, heretofore, to find all but about 25 per cent of the abrasive grain reduced to a much smaller grain size than that originally started with, and, in fact, to find that as great as 35 per cent were in the form of fines.

The invention is particularly advantageous on account of the ease in handling the ingredients during manufacture inasmuch as the consistency of the fluid rubber mixture employed is such that the abrasive grain and sulphur may be easily incorporated therewith. Moreover, the rubber content of the finished article may be easily controlled. In view of the improved method of drying whereby thorough drying takes place, the subsequent vulcanization is uniform and thorough throughout.

Having thus described my invention, what I claim as new and desire to secure by Letters Patent is:

1. The improvement in the manufacture of rubber bonded articles containing granular material comprising admixing abrasive grain and a vulcanizing agent with rubber latex having a total rubber content of not less than 30 per cent by weight, shaping the resultant mixture substantially to the desired form, and subsequently drying and vulcanizing the thus shaped article.

2. The improvement in the manufacture of rubber bonded articles containing granular material comprising admixing abrasive grain and a vulcanizing agent with a fluid rubber mixture containing rubber latex, shaping the mixture to the desired form, and subsequently drying and vulcanizing the thus shaped article.

3. The improvement in the manufacture of rubber bonded abrasive articles comprising forming a fluid rubber mixture by agitating abrasive grain and a solution of rubber together with rubber latex and a vulcanizing agent, shaping the mixture substantially to the form desired, and subsequently drying and vulcanizing the thus shaped article.

4. The improvement in the manufacture of rubber bonded abrasive articles comprising forming a fluid mixture containing rubber latex, abrasive grain and sulphur of a consistency capable of being formed into a desired shape, drying the mixture in substantially the form desired at a temperature less than 100° C. while subjected to a vacuum exhaust, and thereafter vulcanizing the dried article.

5. The improvement in the manufacture of rubber bonded abrasive articles comprising treating rubber latex with an agent of a character and in an amount to increase the consistency of the latex so that granular material may be uniformly and intimately mixed and maintained suspended therein, incorporating abrasive grain and a vulcanizing agent in the mixture and shaping substantially to the form desired, and subsequently drying and vulcanizing the thus shaped article.

Signed at Worcester, Massachusetts, this 23rd day of October, 1926.

DUANE E. WEBSTER.